United States Patent

[11] 3,593,614

[72] Inventors: Maso Galbarini
Pavia;
Francesco Cotta Ramusino, Milan, both of, Italy
[21] Appl. No. 820,162
[22] Filed Apr. 29, 1969
[45] Patented July 20, 1971
[73] Assignee Innocenti Societa Generale Per L'Industria Metallurgica E Meccanica
Milan, Italy
[32] Priority May 24, 1968
[33] Italy
[31] 51784-A/68

[54] CHUCK DEVICE FOR RELEASABLY ATTACHING A MILLING CUTTER TO A MACHINE TOOL SPINDLE
6 Claims, 3 Drawing Figs.

[52] U.S. Cl. .................................. 90/11 A, 279/120
[51] Int. Cl. .................................. B23c 1/00, B23b 31/16
[50] Field of Search .................................. 90/11.1; 279/119, 120

[56] References Cited
UNITED STATES PATENTS
1,442,659  1/1923  Groene .................. 90/11.1 X
3,396,982  8/1968  Sampson ............... 279/120

Primary Examiner—Gil Weidenfeld
Attorney—Sughrue, Rothwell, Mion, Zinn and Macpeak ABSTRACT: This invention provides a chuck device for releasably attaching a milling cutter to a machine tool such as a large size milling-boring machine having an inner spindle slidable coaxially within a hollow outer spindle. The chuck device has a head which is attachable to the outer spindle of the machine tool and a plurality of clamping jaws mounted in the head for radial sliding movement under the action of cam means in response to axial movement of the inner spindle. Each jaw has a radially inwardly projecting portion which clamps, preferably by a jamming action, a cutter assembly to the head, rotation of the cutter assembly relative to the head being prevented. Preferably a compressed air stream is directed over the mating surfaces of the cutter assembly and the head from internal passages in the head for cleaning purposes.

3,593,614

CHUCK DEVICE FOR RELEASABLY ATTACHING A MILLING CUTTER TO A MACHINE TOOL SPINDLE

This invention relates to chuck devices for releasably attaching milling cutters to rotary spindles of machine tools, more particularly milling-boring machines of large size.

Known arrangements for securing large diameter milling cutters to the rotary spindles of milling-boring machines entail the use of screws, tierods or like securing means, together with centering means for accurately centering the cutters on the spindles.

Such known arrangements suffer from various drawbacks, notably the excessively long time needed for assembly and disassembly of the components and for cleaning the components to be coupled before assembly, the impossibility of effecting automatic assembly, and the risk of geometrically inaccurate assembly due to nonuniform of asymmetrical tightening of the screws or like securing means.

An object of the present invention is to obviate the above drawbacks by providing a chuck device which is simple and sturdy in construction and which enables quick and automatic assembly of a milling cutter, particularly a cutter of large size, on the spindle of a machine tool such as a boring-milling machine, while ensuring true centering and geometrically correct positioning of the milling cutter on the machine tool spindle.

A further object of the invention is to provide a chuck device of the above-mentioned type which facilitates assembly of the milling cutter on and release of the cutter from the machine tool spindle, while avoiding any idle time which would otherwise be required for cleaning the components to be coupled together.

The chuck device of the invention is adapted to be fitted to a milling-boring machine having an axially movable inner spindle coaxially arranged within a hollow outer spindle.

The main characteristic feature of the chuck device according to the invention is that the device comprises in combination a head adapted to be attached to the outer spindle of the machine tool, a plurality of clamping jaws mounted in the head for radial sliding movement in response to axial movement of the inner spindle, each said jaw having a radially inwardly projecting portion at its radially inner end adapted to be interengaged with complementary surfaces on the cutter or on a support member attached thereto to secure the cutter to the head, and means being provided for effectively preventing rotation of the cutter about the axis of the head.

Further characteristic features and advantages of the invention will be understood from the following detailed description, given by way of example only, with reference to the accompanying drawings, wherein.

Figure 1:
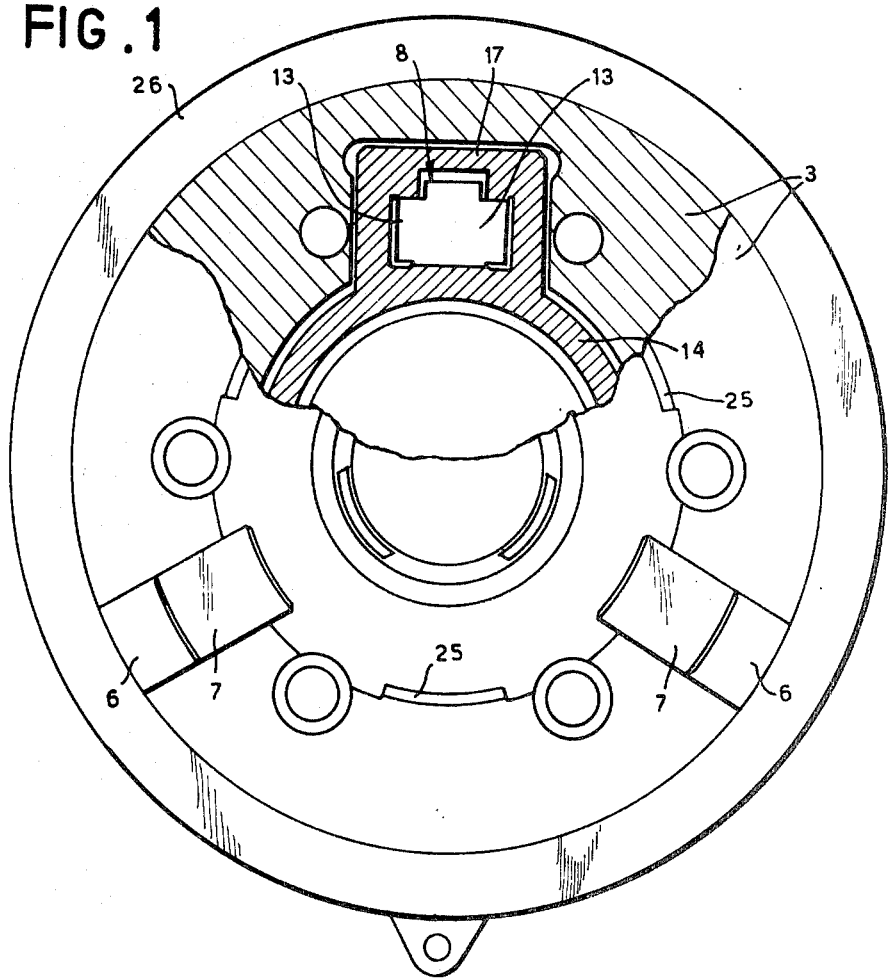
FIG. 1 is a part sectional front elevational view of a chuck device according to one embodiment of the invention for quick-release fastening of a milling cutter to a machine tool.
Figure 3:
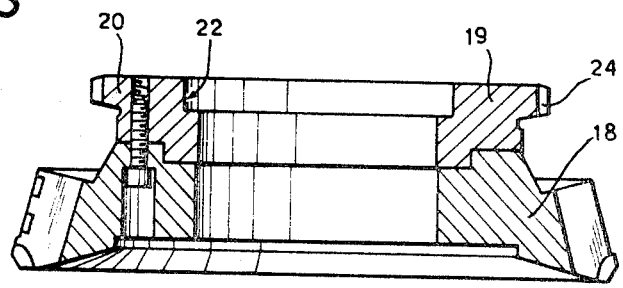
FIG. 3 is an axial sectional view of a milling cutter associated with a support member for attachment to the chuck device of FIGS. 1 and 2.

A machine tool, such as a milling-boring machine of large size, is provided with an outer hollow rotary spindle 1 (FIG. 2) having an inner rotary spindle 2 coaxially arranged therein. Tool heads to be driven with the higher driving powers provided by the machine are normally secured to the outer spindle 1.

The inner spindle 2, which is angularly secured to the outer spindle 1 for rotation therewith but which is axially movable relative to the outer spindle 1, is generally employed for transmitting smaller powers to tool heads, for carrying out machining steps such as drilling holes, reaming and the like which do not cause appreciable radial loads on the tool heads.

The chuck device according to the invention comprises a cylindrical head 3 secured to the free end of the outer spindle 1 by a plurality of screws 5, the head 3 being accurately centered on the spindle 1 by engagement with an annular centering shoulder 4 formed on the end of the spindle 1.

The cylindrical head 3 is formed with a plurality of radial grooves 6 or T- or dovetail-shaped cross section, preferably three in number A respective clamping jaw 7 is slidably mounted in each respective groove 6 so as to be capable of radial translational movements relative to the head 3.

Each clamping jaw 7 is movable by a respective jaw operating 8 having a pivot pin 11 supported by the head 3, and extending tangentially with respect to the axis of the head 3. The lever 8 has a shorter arm 9 engaged in a recess 10 in a rearwardly facing portion of the radially outer end, or heel, of the respective jaw 7. Each shorter arm 9 has a part-spherical surface in axial section (FIG. 2) which mates with complementary surfaces in the respective recess 10 to form a swivel joint therein. The lever 8 also has a longer arm 12 provided with cylindrical laterally extending studs 13 engaged by a cam member 14 connected to the end of the axially slidable inner spindle 2.

The cam member 14 is connected to the inner spindle 2 by means of a ring 15 and a tapped collar 16 forming a coupling which locks the cam member 14 in an axial direction while allowing a degree of freedom of movement in a radial direction.

The cam member 14 has rear profiled portions 14a which engage the laterally extending studs 13 of the respective jaw operating levers 8. The studs 13 are also engaged by conjugate counter-cams 17 carried by the cam member 14 and shaped so as to move the levers 8 desmodromically.

Thus when the cam member 14 moves rearwardly (that is, to the right as view in FIG. 2) the levers 8 are rocked in an anticlockwise sense, moving the jaws 7 radially inwardly or centripetally, while when the cam member 14 moves forwardly, the counter-cams 17 carried thereby engage the levers 8 and rock the latter in a clockwise sense (as viewed in FIG. 2), moving the jaws 7 radially outwardly or centrifugally.

Rearward and forward movement of the cam member 14 and of the counter-cams 17 carried thereby is effected by axial displacement of the inner spindle 2 relative to the outer spindle 1 rearwardly or forwardly respectively. Conventional stop means (not shown) are provided for arresting the axial movement of the inner spindle 2 in locked and unlocked positions respectively of the chuck device, which may be determined without precision machining, corresponding to the radially innermost and outermost positions respectively of the clamping jaws 7.

Figure 2:
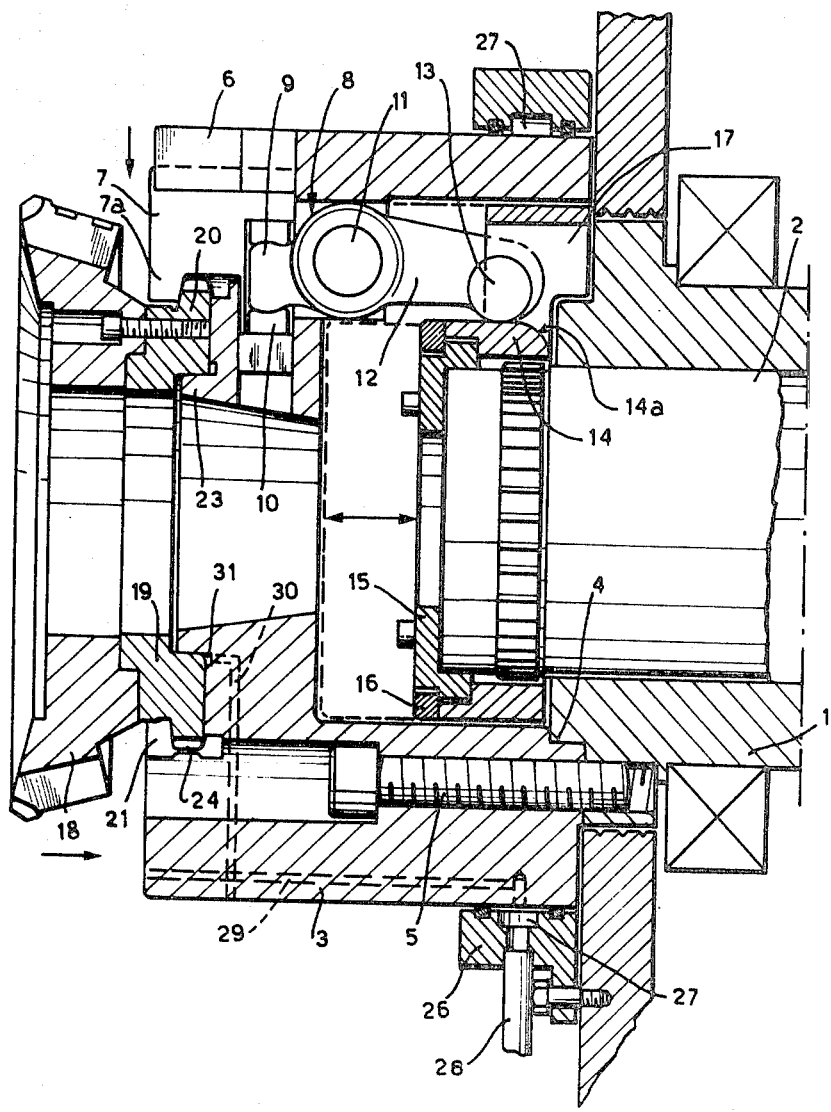
FIG. 2 is an axial sectional view of said chuck device.

The forward portion of the cylindrical head 3 is adapted to engage a cutter assembly comprising in this example a large size milling cutter 18 provided with a rear support member 19 either formed integrally with the cutter 18 or separately attached thereto. The support member 19 has an annular radially outwardly projecting flange 20 for engagement by radially inwardly projecting portions 7a on the jaws 7 in the locked position of the chuck device (FIG. 2). The cutter support member 19 is accommodated in an annular seat 21 formed in the forward face of the head 3. The cutter support member 19 is formed in its rear face with a cylindrical countersunk bore 22 which fits closely over a cylindrical collar 23 on the head 3 for centering the cutter assembly with respect to the axis of rotation of the head 3.

A centripetal or radially inward movement of the chuck jaws 7 by rearward movement of the inner spindle 1 clamps the flange 20 of the milling cutter support member 19 to the head 3 and hence to the outer spindle 2, thereby locking the chuck device quickly and automatically.

The radial freedom of movement of the cam member 14 causes the forces resulting from axial movement of the spindle 2 to be equally distributed over the levers 8, and hence the clamping jaws 7, notwithstanding unavoidable constructional inaccuracies of the components of the chuck device or inaccuracies in the coupling of the milling cutter assembly to the head 3.

The projecting portions 7a of the jaws 7 and the cooperating surface on the flange 20 of the milling cutter support member 19 are formed with mating frustoconical clamping surfaces inclined to the axis of the chuck head 3 to thereby improve the clamping of the cutter assembly by a jamming action.

In order to avoid rotational slipping of the milling cutter assembly about the axis of the spindle 2 when the cutter assembly 8 is held in the chuck device, the flange 20 on the milling cutter support member 19 is formed on its outer periphery with an annular row of teeth 24 adapted to cooperate with arcuate toothed segments 25 carried by the cylindrical head 3.

When the inner spindle 1 is moved forwardly (i.e. to the left as viewed in FIG. 2) the jaws 7 are drawn away from the flange 20 releasing the milling cutter assembly which can then be easily removed from the head 3.

A compressed air distributor is provided around the head 3 and comprises a ring 26 secured to a stationary part of the machine tool and formed with an annular groove 27 encircling the head 3. The groove 27 constitutes a manifold which is fed with compressed air through a feed conduit 28. The groove 27 communicates through internal passages 29 and 30 (shown in broken outline) in the head 3 with a circumferential outlet channel 31 surrounding the collar 23 on the end surface of the head 3 which is engaged by the rear face of the cutter support member 19 when the cutter assembly is held in the chuck device. By this means an airstream can be passed over the mating surfaces of the head 3 and the cutter support member 19. The compressed air supply is such that this airstream is sufficiently powerful to drive away dust and other foreign bodies which would otherwise hinder mutual engagement of these surfaces and the accurate centering of the cutter assembly on the chuck device.

We claim:

1. In a machine tool of the type having a hollow outer rotary spindle and an inner rotary spindle slidable coaxially within the outer spindle, a chuck device for effecting quick release attachment of a milling cutter assembly, said chuck device comprising in combination:

a head having means adapting said head to be secured to and supported radially by the outer spindle of the machine tool, a pilot guide means on the surface of said outer spindle for accurately positioning said head on said outer spindle, a plurality of clamping jaws mounted for radial sliding movement in the head, jaw-operating means operatively connected to the inner spindle for effecting a radial movement of said jaws in response to axial movement of the inner spindle, a radially inwardly projecting portion having a clamping surface at the radially inner end of each jaw said radially inwardly projecting portions having a frustoconical surface on the inner surface thereof, a complementary frustoconical clamping surface on the cutter assembly mating with each said frustoconical clamping surface of the jaw projecting portions to secure the cutter assembly to the head in a clamped position of the chuck device, a cylindrical collar formed on the head and having one end thereof extending toward the cutter assembly, the outer surface of said cylindrical collar being positioned radially inwardly from said radially inwardly projecting portion of said clamping jaws, said outer surface of said cylindrical collar acting to center the cutter assembly and provide radial support therefor, and means effective to prevent rotation of the cutter assembly relative to the head about the axis of the head, whereby radially inward movement of the jaws locks the cutter assembly relative to the head by a jamming action between the complementary frustoconical surfaces.

2. Chuck device as claimed in claim 1 wherein the means for preventing rotation of the cutter assembly comprises an annular row of teeth on the cutter assembly and cooperating toothed segments of the head which mesh with said teeth when the cutter assembly is clamped in the chuck device.

3. Chuck device as claimed in claim 2, wherein the cutter assembly comprises a cutter and a cutter support member attached to the cutter and engageable with the clamping jaws.

4. Chuck device as claimed in claim 1, wherein the jaw-operating means comprise respective levers, means supporting said levers for rocking movement in said head, and cam means positively engaging said levers to cause rocking movement thereof in response to axial movement of the inner spindle, respective said levers engaging respective said clamping jaws to effect positive movement thereof radially for clamping and release of the chuck device selectively upon axial movement of the inner spindle in opposite directions.

5. Chuck device as claimed in claim 4, wherein the cam means include a cam member attached to the inner spindle and formed with portions of shaped profile in axial section, and means attaching said cam member to said inner spindle for movement axially with said spindle but with freedom of movement radially, whereby the forces on the clamping jaws are equally distributed in operation of the chuck device.

6. Chuck device as claimed in claim 1, wherein the head further comprises, a circumferential channel in the surface of the head against which the cutter assembly bears, and is further provided with internal passage means communicating with said channel and adapted to be connected to a compressed air supply to provide an airstream at said surface for cleaning this surface on assembly of the cutter assembly on the head.